(12) United States Patent
Torring et al.

(10) Patent No.: US 7,523,718 B2
(45) Date of Patent: Apr. 28, 2009

(54) SYSTEM AND METHOD FOR TRANSPORTING LIVE AQUATIC ANIMALS

(75) Inventors: Ditte Torring, Nykobing Mors (DK); Christian Lauersen, Nykobing Mors (DK); Arne Baekgard, Bedsted Thy (DK); Lars Nannerup, Rungsted (DK); Flemming K. Nielsen, Copenhagen K (DK); Richard D. Schmidt, Tinglev (DK); Gert Jorgensen, Tinglev (DK)

(73) Assignees: Maersk A/S, Copenhagen K. (DK); Fjord's Logistic APS, Nykobing Mors (DK)

( * ) Notice: Subject to any disclaimer, the term of this patent is extended or adjusted under 35 U.S.C. 154(b) by 144 days.

(21) Appl. No.: 11/386,044

(22) Filed: Mar. 21, 2006

(65) Prior Publication Data

US 2007/0022966 A1  Feb. 1, 2007

(30) Foreign Application Priority Data

Mar. 23, 2005  (DK) ............................... 2005 00417

(51) Int. Cl.
*A01K 63/02* (2006.01)
(52) U.S. Cl. ...................... 119/203; 119/227
(58) Field of Classification Search ............. 119/200, 119/201, 202, 203, 204, 205, 214, 215, 217, 119/224, 226, 227, 228, 229, 234, 236, 243, 119/245, 248, 259, 260, 261, 262, 263
See application file for complete search history.

(56) References Cited

U.S. PATENT DOCUMENTS

| 899,057 | A | 9/1908 | Kleinschmidt |
| 1,156,515 | A | 10/1915 | Barba |
| 3,687,111 | A | 8/1972 | Epper |
| 5,572,952 | A | 11/1996 | Manome |
| 2004/0118359 | A1 | 6/2004 | Badell |
| 2006/0102536 | A1* | 5/2006 | Hochgesang et al. ........ 210/169 |

FOREIGN PATENT DOCUMENTS

FR   2 692 105   12/1993

* cited by examiner

*Primary Examiner*—Trinh T. Nguyen
(74) *Attorney, Agent, or Firm*—Ladas and Parry LLP (57) ABSTRACT

A system for transporting live aquatic animals between shipping points, said system comprising water filled tank units 300 for containing the live animals in a life supporting aquatic environment during the transport; and a refrigerated marine container 200 provided with means 240, 250, 260 for cooling, aerating and circulating the water in said tank units at least during the transport; said system further comprising docking stations 100 situated at said shipping points, said docking stations comprising docking means for receiving said refrigerated marine container 200 containing said tank units 300; and means 120, 130, 140 for providing a life supporting aquatic environment for the live aquatic animals in said tank units 300 placed in said refrigerated marine container 200 while the refrigerated marine container 200 is attached to the docking station 100.

13 Claims, 3 Drawing Sheets

SYSTEM AND METHOD FOR TRANSPORTING LIVE AQUATIC ANIMALS

TECHNICAL FIELD

The invention relates to a system for transporting live aquatic animals between shipping points, said system comprising water filled tank units for containing the live animals in a life supporting aquatic environment during the transport; and a refrigerated marine container provided with means for cooling, aerating and circulating the water in said tank units at least during the transport.

The invention further relates to a method for transporting live aquatic animals between shipping points, said method comprising the steps of
placing live aquatic animals in water filled tank units;
placing the tank units in a refrigerated marine container provided with means for cooling, aerating and circulating the water in said tank units at least during the transport;
transporting the live aquatic animals in said refrigerated marine container, while cooling, aerating and filtering the water in said tank units; and
removing said live aquatic animals upon reaching the destination shipping point.

RELATED PRIOR ART

Global consumers are increasingly demanding fresher and higher quality food products. As a result of this, the sale of fresh and live (versus frozen) fish/aquatic food products has increased considerably within the latest time.

Due to the problems related to keeping the aquatic animals alive during transport over extended periods of time, the typical way of transporting live aquatic animals is by air freight. Typically there is a 3 days distribution "range".

The cost of transporting fish-/aquatic food products by air is extremely high. Therefore, this way of transport is performed mainly in relation to high value products such as Lobster, Langouste and Langoustine.

Therefore there is a need for a large scale transportation solution available for the international producer and/or distributor of live fish/aquatic food products, e.g. shellfish or other aquatic animals, in order to make the distribution of lower value aquatic food products possible and the distribution of high value products more cost efficient.

Numerous systems and transport methods are known in the art. In order to keep the aquatic animals alive over extended periods of time the fact that many aquatic animals, such as shellfish can be brought into a dormant state of hibernation by lowering the temperature of the water in which they are kept with respect to the temperature of the water in which the animals live their natural lives. During hibernation the metabolism of the animals is considerably reduced. Hence the animals need less nutrition and they produce fewer waste products, which will soil the water in which the animals are placed. Such waste products are e.g. carbon dioxide ($CO_2$), particulate and dissolved organic material (COD&BOD), ammonia. Eventually, the concentration of waste products in the water will reach a critical value where the waste products, especially ammonia, become poisonous to the animals. Therefore, during long-term transportation it is necessary to filter or purify the water.

One such recent system and method for transporting e.g. shellfish is taught in US 2004/0118359A1, the system consisting of a series of tank units placed in an isolated freight container. The water in the tank units in the container are cooled by forcibly circulating cooled air through the water in the tank units via a piping connecting the tank units to a central cooling unit of the container. The tank units are further connected by piping to a central series of filters. Water from the tank units is circulated through the filters, in order to filter the waste products from the water.

A further realization, on which the present invention rests, is that the animals, in the dormant state are more tolerant or resistant to high levels of contamination. This fact means that if the temperature is raised too quickly after the transport, the animals will "wake up" to an environment that in their waken state will be dangerous or even poisonous to the animals. Consequently, a large part of the animals will die, and must be discarded.

The typical alternative thereto is to remove the animals from their containers very quickly when they reach a destination shipping point, or to equip the containers with large, expensive, complex, high capacity filtering mechanisms, such as disclosed in US 2004/0118359A1.

Biological purification is the traditional way of water purification known also from saltwater aquariums etc. This method of purifying the water is slow when the water temperature needs to be kept below the temperature where the animals are in their hibernating state which in most cases is below 5 degrees.

Some species of animals takes longer acclimatization periods, when they are cooled to hibernation temperature. This means that there is a need for a transportation system that can keep the animals alive, while the temperature is lowered to hibernation temperature, in a cost and energy efficient way and keep the water clean for the duration of the cooling process.

OBJECT OF THE INVENTION

It is an object of the present invention to provide a system and a method for transporting live aquatic animals between shipping points that overcomes the problems of the prior art. It is a further object of the invention to provide an alternative system and method for transporting live aquatic animals between shipping points.

It is a further object of the present invention to provide a system and a method for transporting live aquatic animals between shipping points that decreases the mortality rate of the aquatic animals at the shipping point prior to the transport, during transport, when the transport has arrived at the destination shipping point and/or during reloading after arrival at the destination shipping point.

It is a further object of the invention to provide a system and a method of transportation which increases the distribution "range", with respect to distance as well as to time, and which will increase the distribution capacity of the industry.

It is a further object of the invention to provide a system and a method of transportation which is cost efficient, where the system is easy to handle, and is robust such that the need of surveillance of the animals during transportation is decreased or eliminated.

It is a further object of the present invention to provide a system for transport that may incorporate all the needs for storage during fishing, transportation and reseller warehousing. Yet a further object is to provide a system that avoids the need to reload the product—the live aquatic animals—through the transportation chain.

It is a further object of the invention to provide a system and a method of transportation which is suitable for a refrigerated marine container based transportation infrastructure.

It is a further object of the invention to provide a system and a method of transportation which allows for increased product freshness—such that the product is allowed to be taken out of the water hours only before serving.

It is a further object of the invention to provide a system and a method of transportation which allows even a low value product, e.g. mussels to reach markets where they today are not present and help to level out market prices.

SUMMARY OF THE INVENTION

The object of the invention is achieved by a system for transporting live aquatic animals between shipping points, said system comprising water filled tank units for containing the live animals in a life supporting aquatic environment during the transport; and a refrigerated marine container also called a reefer container, which container is provided with means for cooling, aerating and circulating the water in said tank units at least during the transport, wherein the system further comprises docking stations situated at said shipping points, said docking stations comprising docking means for receiving said refrigerated marine container containing said tank units; and means for providing a life supporting aquatic environment for the live aquatic animals in said tank units placed in said refrigerated marine container while the refrigerated marine container is attached to the docking station.

A shipping point could be any point or place where one or more docking stations according to the invention are situated.

In a preferred embodiment of the invention the means for providing a life supporting aquatic environment for the live aquatic animals provided in the docking stations comprises circulation means for circulating water between the tank units in the refrigerated marine container and the docking station; filtering means for purifying water circulated between said tank units in the refrigerated marine container and the docking station.

The means for providing a life supporting aquatic environment for the live aquatic animals provided in the docking stations preferably further comprises cooling means for cooling water circulated between the tank units in the refrigerated marine container and the docking station.

The means for providing a life supporting aquatic environment for the live aquatic animals provided in the docking stations preferably further comprises means for aerating the water circulated between the tank units in the refrigerated marine container and the docking station;

The refrigerated marine container preferably comprises a first piping for circulating water between each of said tank units and said docking station, while the refrigerated marine container is attached to the docking station.

The first piping leads water untreated from coupling means provided between the docking station and the refrigerated marine container to and from the tank units inside the refrigerated marine container.

The refrigerated marine container comprises a second piping for distributing air from the inside of said refrigerated marine container to each of said tank units in order to aerate the water inside the tank unit and creating an airlift effect in order to circulate the water in the tank unit at least during transport.

The refrigerated marine container comprises air circulation means, preferably in the form of a compressor, said air circulation means being separate from said means for cooling the water in said tank units, and said air circulation means being in communication with said second piping.

Each tank unit preferably comprises a tank provided with its own individual set of filters for at least partly purifying the water contained in the tank during transportation, and in that said tank and said filters are integrated in a single unit.

The water contained in each tank unit is circulated through said filters by the airlift effect caused by the air passed through said tank unit.

Each tank unit is provided with at least three filters, and the filters are arranged in parallel communication with the tank.

The set of filters comprises a particle filter and at least one biological filter, and option for an activated carbon filter The cooling means for cooling the water in said tank units at least during the transport being provided in the refrigerated marine container comprises a cooling unit for cooling air passing through the cooling unit, air circulation means for circulating air contained in the refrigerated marine container and through said cooling unit.

The object of the invention is further achieved by a method for transporting live aquatic animals between shipping points, said method comprising the steps of placing live aquatic animals in water filled tank units;

placing the tanks in a refrigerated marine container provided with means for cooling, aerating and circulating the water in said tank units at least during the transport;

connecting the refrigerated marine container to a docking station, arranged at a shipping point location for said transport; said docking station, being provided with docking means for receiving said refrigerated marine container; and means for providing a life supporting aquatic environment for the live aquatic animals in said tank units placed in said refrigerated marine container while the refrigerated marine container is attached to the docking station;

circulating water contained in said tank units between said tank units and said docking station;

cooling the water in the tank units;

purifying the water in said docking station as long as the refrigerated marine container is attached to said docking station;

detaching the refrigerated marine container only when the water in said tank units has reached a temperature where the live aquatic animals located therein are in a hibernating state;

cooling the water in the tank units by cooling the refrigerated marine container storage space when the refrigerated marine container is detached from the docking station;

circulating air through the tank units when the refrigerated marine container is detached from the docking station, aerating the water and creating an airlift effect;

passing the water in said tank units through filters arranged in each tank unit solely by means of the airlift effect;

attaching the refrigerated marine container to a docking station at the destination shipping point, and maintaining the water temperature in the tanks units until the water has been purified.

Further it is achieved by the invention that one or more tank units are attached to the docking station before placing the tank units in the refrigerated marine container.

Further it is achieved by the invention that one or more tank units are attached to the docking station after the tank units are removed from the refrigerated marine container.

DESCRIPTION OF THE DRAWINGS

The invention will be described in detail in the following with reference to the drawings in which FIG. 1 schematically shows a system for and a method of transporting live aquatic animals according to the invention in two different situations, where.

The drawings illustrate embodiments of the present invention. It is understood that other embodiments may be utilized and structural and operational changes may be made without departing from the scope of the present invention.

DETAILED DESCRIPTION OF EMBODIMENTS OF THE INVENTION

Figure 1A:
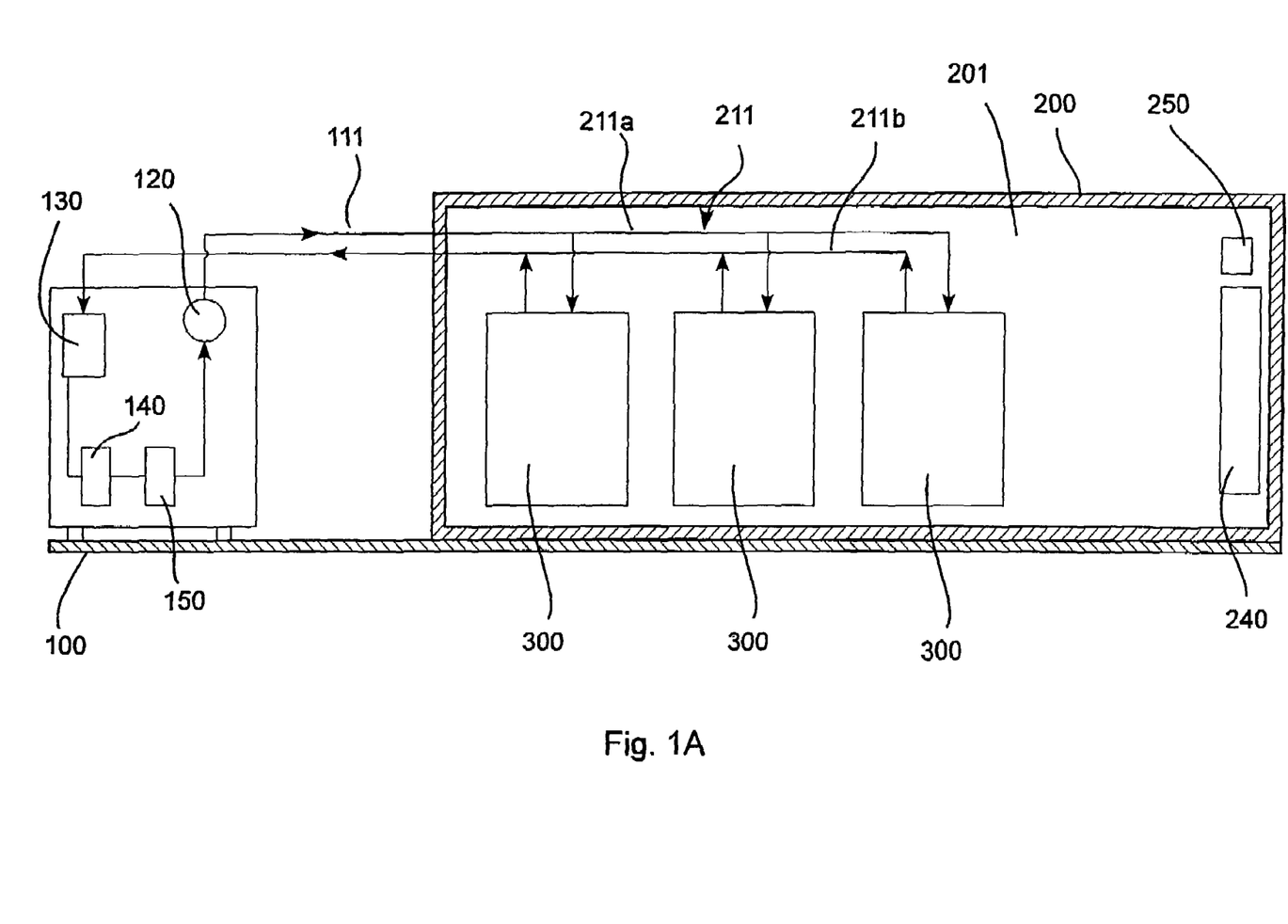
FIG. 1A shows the system with the container and the tank units connected to the docking station prior to the transport or after the transport.
Figure 1B:
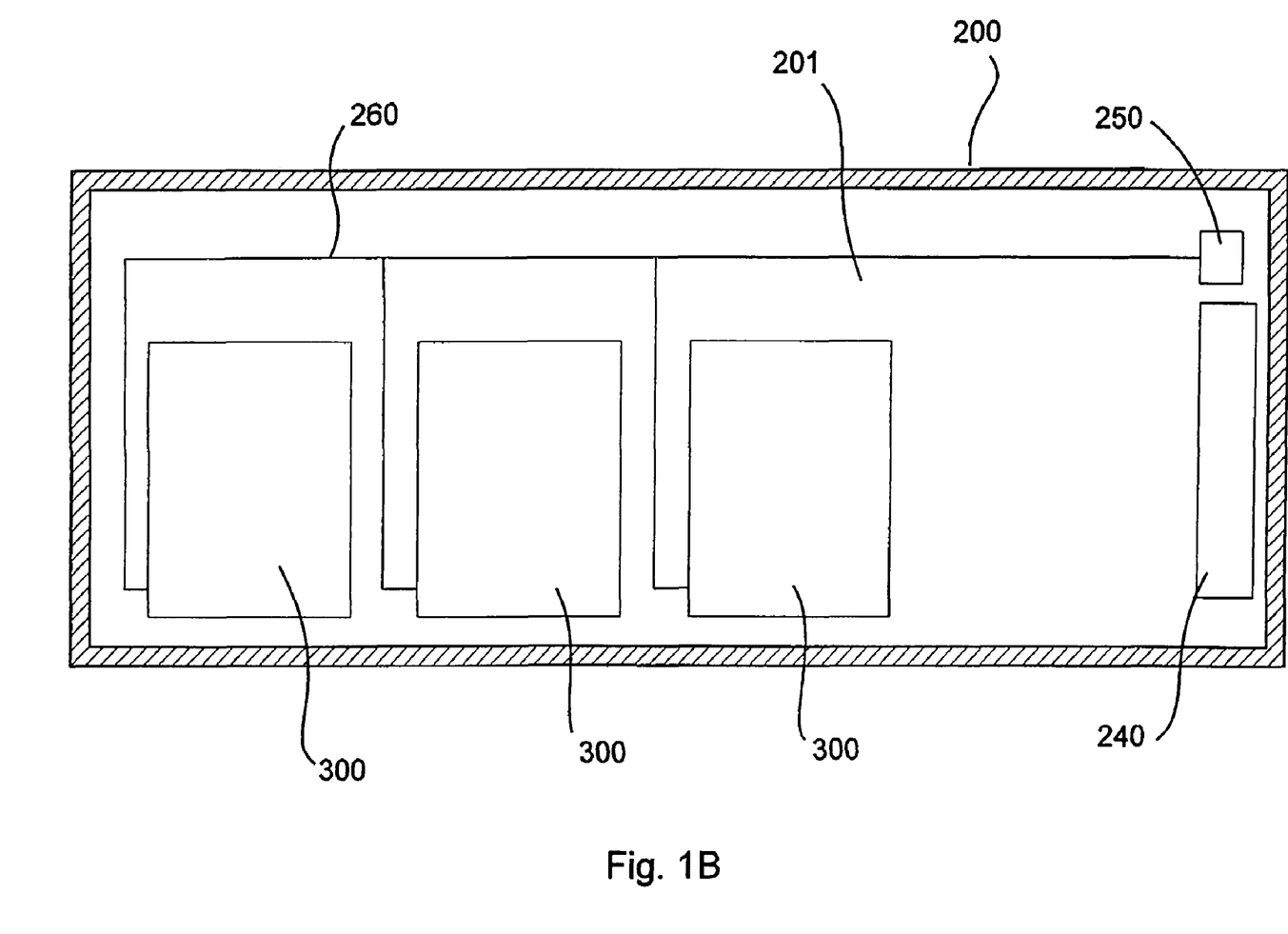
FIG. 1B shows a container with tank units during transportation.

Referring firstly to FIG. 1A, a system comprising a docking station 100, a refrigerated marine container, a so called reefer container 200, and a plurality of tank units 300, is shown. The system is intended for transporting live aquatic animals between destination shipping points, e.g. between ports or major civic foodstuffs distribution centers.

The tank units 300 are adapted for holding live aquatic animals, such as oysters, crabs, scallops, aquatic snails, mussels, Razor mollusks, finfish or other in a live supporting aquatic environment, prior to, during and after transport of the live aquatic animals placed in the tank units 300 between shipping points. The tank units 300 will be described in further detail below, but are adapted for placement in a refrigerated marine container 200.

The refrigerated marine containers 200 are adapted for containing the tank units 300 and are equipped with means for providing cooling and circulation of the water in the tank units during transport of the container between the shipping points. The refrigerated marine container 200 will be described in further detail below.

At each shipping point at least one docking station 100 is situated. Each docking station 100 comprises docking means (not shown) for receiving said refrigerated marine containers 200. In its simplest form said means for receiving said refrigerated marine container 200 is constituted by connection means 111 for connection to a first piping 211 arranged in the refrigerated marine container 200, which will be described in further detail below. However it may also comprise means for holding and sheltering the refrigerated marine container 200, and/or means for providing power, e.g. in the form of electricity to the refrigerated marine container 200.

The docking station 100 further comprises means for providing a life supporting aquatic environment in the tank units 300 provided in said refrigerated marine container 200 when the refrigerated marine container is attached to the docking station. These means for providing a life supporting aquatic environment preferably comprise circulation means 120 for circulating water between the docking station 100 and the tank units 300, preferably in the form of a pump such as a compressor, filtering means 130 for purifying the water circulated between the tank units 300 and the docking station 100, e.g. in the form of a plurality of filters and other water treatment means, and cooling means 140 in the form of heat exchangers. However, in another embodiment the circulated water may be cooled by cooling means in the refrigerated marine container 200.

The filtering means 130 may comprise UV filters, biological filters and/or protein skimmers or any combination hereof. The filtering means 130 at the docking station should have a high capacity of purifying the water circulated between the tank units 300 and the docking station 100 relative to the quantity of water contained in the tank units 300 in the container, such that the water in the tank units 300 can quickly be purified prior to departure or upon arrival at a shipping point. Thus, in order to purify the water of e.g. twenty tank units 300 placed in e.g. a 40 ft. refrigerated marine container 200 the filter capacity of the filtering means at the docking station 100 should be such that the water can be purified or exchanged within a time period suitable to the specific aquatic animal to be shipped or transported in one or more tank units 300.

The refrigerated marine container 200 used in the present system is preferably a standard insulated refrigerated marine container cooled by forced air cooling, e.g. a 40 ft. refrigerated marine container, adapted or made for transportation by ship or truck. Thus the system may be a land transport system or a sea transport system or a combination thereof. An insulated refrigerated marine container 200 of this kind usually comprises an interior cargo holding space 201 enclosed by side walls, end walls, a top and a bottom, each of which is a double wall (sandwich type) construction having an insulation formed between a double metal plating. At one end of the refrigerated marine container 100 a cooling unit 240 is provided. The cooling unit 240 is well known in the art of refrigerated marine containers 200, and comprises air circulation means, e.g. in the form of a fan (not shown) and heat exchanging means (not shown). Thus, air taken from the interior 201 of said refrigerated marine container 200 is forced past the heat exchanging means by the fan, thus cooling the air stream, which cooled air stream is directed to the interior 201 of the refrigerated marine container 200. However, the present invention will work with refrigerated marine containers cooled in alternative manners.

The refrigerated marine container 200 used in the present system must be slightly modified to operate in this system. The refrigerated marine container 200 thus comprises a first piping 211 arranged within said refrigerated marine container 200 and adapted for being connected to the connection means 111 on said docking station 100 at one end, and to said tank units 300 at another end, when said tank units 300 are located within said refrigerated marine container 200. The first piping 211 is shown in FIG. 1A. A first conduit 211a of said piping 211 leads from said connection means 111 on the docking station 100 to each of said tank units 300, in order to provide purified water from the docking station 100 to said tank units 300, when the refrigerated marine container 200 is situated at the docking station 100. Further, a second conduit 211b of said piping 211 leads from each of said tank units 300 to said connection means 111 on the docking station 100, in order to lead or circulate untreated water from the tank units 300 to be purified in the filter means 130 in the docking station, when the refrigerated marine container is located in the docking station 100.

A second piping 260 is provided inside the refrigerated marine container 100 as well. The second piping 260 is at a first end connected to secondary air circulation means 250, also provided inside said refrigerated marine container 200. Said second piping 260 is at its other end adapted to be connectable to each tank 300, when the tank units 300 are situated inside said refrigerated marine container 200. The second piping is thus adapted to providing a stream of compressed air to each tank, at least when the refrigerated marine container 200 is under transport. The air supplies the necessary oxygen and strips excess $CO_2$ by simple aeration of the tank units 300 through a diffuser placed in each tank 300 as will be further described below.

The secondary air circulation means 250 is preferably a compressor adapted for taking air from the inside 201 of said container 200, compressing it and directing it to the tank units 300 via said secondary piping 260. Preferably a supply of fresh compressed air with an overpressure is provided by the compressor.

Figure 2:
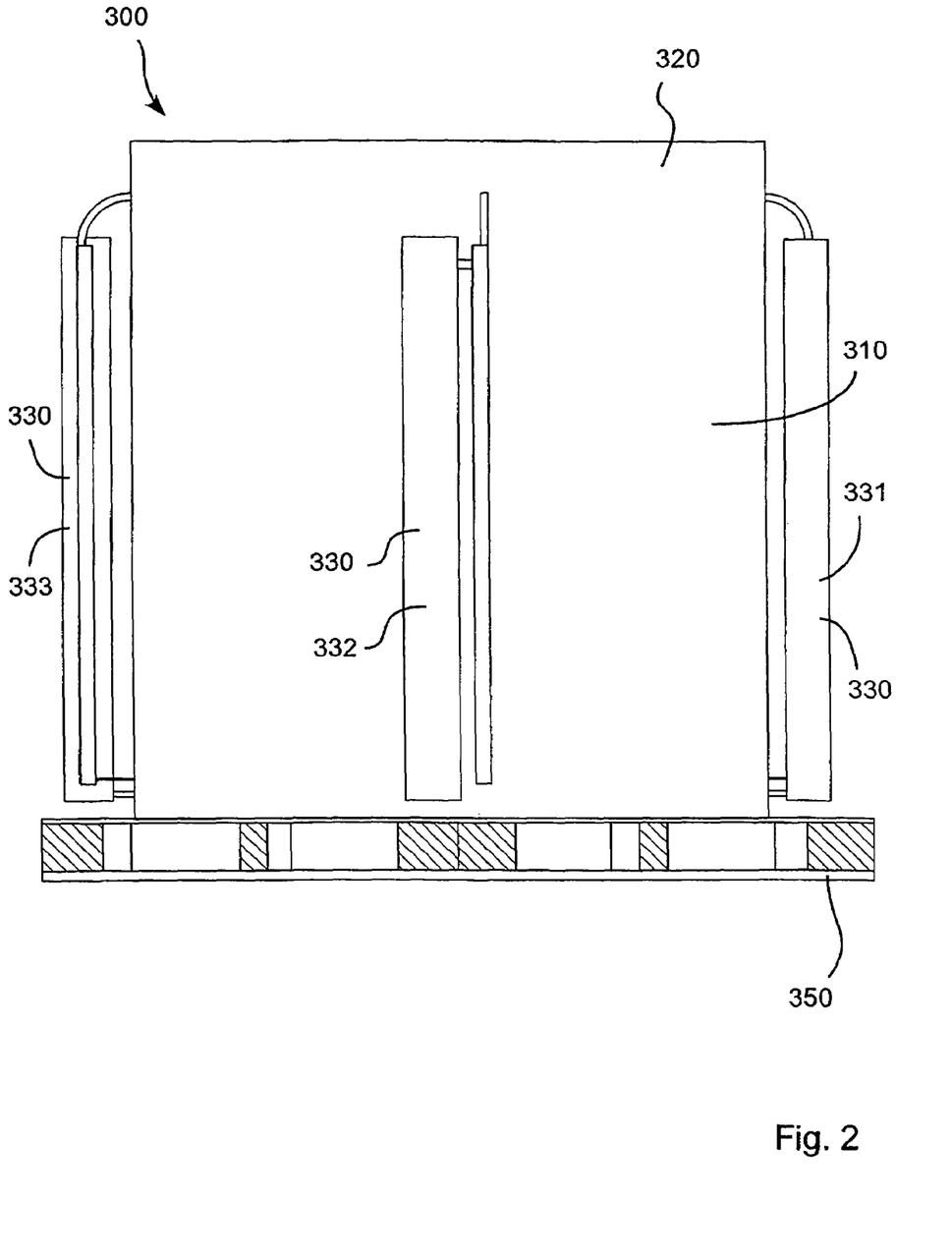
FIG. 2 shows a schematic drawing of an embodiment of tank unit for the system shown in FIG. 1.

The tank units 300 provided for the system according to the invention, and shown in an exemplary embodiment in FIG. 3 preferably comprises a tank 310, having a lid 320 and a set of filters 330.

The tank 310 is adapted for containing a quantity of water. The tank 310 further is preferably compartmentalized. Therefore, the tank 310 is preferably fitted with trays to stack the aquatic animals in full height of the tank, and provide spacing between the animals. Thus the animals situated on the bottom of the tank 310 are not damaged by the weight and possible activity of the live animals (when they are not in their hibernating state) above them. The trays are preferably separate but can be attached to each other or to a support structure such that the trays can be easily removed from the tank unit 300 in unison, and yet easily handled separately once removed from the tank unit 300.

The tank unit 300 further preferably also comprises a pallet 350 on which the tank 310 and filter set 330 is arranged. Thus the tank unit 300 can easily be loaded in and out of a refrigerated marine container, or otherwise be moved.

A set of filters 330, are arranged in close relation to each tank 310. Preferably, at least three filters are formed in filter housings 331, 332, 333 on the side of each tank. Each filer housing is arranged in fluid connection with said tank 310. Inside each filter housing 331, 332, 333 at least one filter cell is arranged. The filter cells can be filled with different types of filter media such as particle traps, activated carbon, zeolite, biological filter, pH buffers etc. There must be minimum 3 filters compartments preferably holding a filter for particle removal, one or more bio filters, and an activated carbon filter. The fluid connection between the tank 310 and each filter housing are preferably arranged in parallel such that if a fluid connection to a filter housing or a filter is blocked, the remaining filters in the other filter housings are kept functioning. Each filter housing may however may be equipped with more than one filter, e.g. of different types, but such that the filters of a single filter housing are arranged in a series one after each other (with respect to the flow of the water created by an airlift effect in the tank 310 as explained below).

When performing biological purification at temperatures below approximately 5 degrees, where the aquatic animals are in their hibernating state, the method of purifying the water is slow. However with biological-filters with a high specific surface area, the biological process can still be maintained. In order to remove COD/BOD from the water activated carbon filters can be used.

A diffuser (not shown) is arranged in the bottom of each tank 310 and the tank unit 300 further comprises means for creating a connection between the diffuser and the above mentioned second piping 260. Thus compressed air can be directed through the water filled tank 310 in order to aerate the water, and to create an airlift effect that will circulate the water in the tank, and thus circulate the water through the set of filters 330. Such an airlift effect in itself is well known in the art, and will not be described in any further detail.

In the system and method according to this invention the purification of the water in the tank units 300 during transport of the refrigerated marine container is provided exclusively by the airlift effect created from circulating compressed air through the tank units 300, i.e. the internal water circulation is driven by compressed air only. They will therefore not require any other electrical power supply or external water exchange. The air supplies the necessary oxygen and strips excess $CO_2$ by simple aeration of the tank units through a diffuser. The tank lid 320 is fitted with air release pipe or valve. The filters being powered solely by the airlift effect is possible due to the moderate size and closeness of the filter set 330 to the water filled tanks 310. Thus each tank unit 300 is self-contained and self-sustained, meaning it has the necessary equipment to maintain a satisfactory water quality for living aquatic animals doing long-term transport, only needing a supply of compressed air. These tank units 330 are thus simple, reliable and maintenance free, and allow the tank units not to be under inspection during transport.

Each tank 310 further comprises connection means (not shown), in the form of valves (an inlet and an outlet valve) for creating a fluid connection between each tank 310 and said first piping 211, such that the water in the tanks 310 can be circulated between the tank units 300 and the docking station 100.

In a preferred embodiment of the system each tank 310 is a round, i.e. cylindrical tank 310 placed on a square pallet 350. This gives room for 20 tank units in two rows in a 40 ft. container, still allowing space in the refrigerated marine container 100 to circulate air around the tank units 300, and space for loading and unloading. One or more of the remaining free corners on the square pallet 350 are utilized for filter housings 331, 332, 333 as shown in a preferred embodiment in FIG. 2. The filter housings 331, 332, 333 have a filter compartment and a number of tubes to operate the airlift. The connections of the filters 330 to the tank 310 are all located at the top of the tank 310. The connections to the first piping 211, i.e. the water-in, and water-out are located at the top of the tank.

The tank 310 and the filter housings of the filters 330 are preferably formed in all in a polymer material, but may as well be formed in a metal, e.g. stainless steel or aluminum. The pallet may also be formed in a polymer a metal or in wood. The filter housings and the tank may be formed as separate entities but assembled into an integrated entity or unit, by any conventional means. However, the filter housings and the tank may be formed in a single process by co-extruding the parts in a single item. The pallet 350 is subsequently assembled to the filter housing/tank complex.

The invention also concerns the method of transporting live aquatic animals between shipping points made possible by the above explained system. In the following the use of the system will therefore be described in further detail.

Live aquatic animals are placed in water filled tank units 300 as described above. The tank units can be transported individually and may therefore be carried onto a fishing boat or to another location where live aquatic animals can be harvested. The tank units 300 as described have means for supplying air and filtering the water in the tank unit 300 during this process until the tank unit 300 containing the animals reaches the shipping points. Preferably the water in the tanks is supplied from the habitat of the live aquatic animals where they are "harvested".

The tank unit 300 are placed in a refrigerated marine container 200 as described above, which refrigerated marine container 200 is connected to a docking station 100 also described above at a shipping point location for the transport. In the docking station a life supporting aquatic environment for the live aquatic animals in said tank units 300 placed in said refrigerated marine container 200 is provided for as long as the refrigerated marine container 200 is attached to the docking station 100. This means that the water contained in said tank units 300 is circulated between the tank units 300 and said docking station 100, where the water in the tank units 300 is cooled, and the water is purified in said docking station 100. Thus prior to the transport the aquatic environment in the tank units is very clean, i.e. the content of malicious agents is kept at a very low level.

The refrigerated marine container 200 is detached from the docking station 100 for transport only after the water in said tank units 300 has reached a temperature where the live aquatic animals located therein are in a hibernating state.

During the transport the water in the tank units 300 is cooled only by cooling the refrigerated marine container 100 storage space 101, using the conventional cooling system of a refrigerated marine container 200, e.g. a forced air cooling as described above. Also during transport air is circulated through the tank units 300, aerating the water and creating an airlift effect. The airlift effect created by passing air through the water in said tank units 300 has proven sufficient to circulate the water of the tank units 300 through filters 330 arranged in each tank unit 300.

Upon arrival at the destination shipping point the refrigerated marine container 100 is attached to a docking station 100 similar to the one at the departure shipping point, and the water temperature in the tanks units 300 is maintained at the hibernation temperature of the live animals until the water has been purified in the docking station filtering complex 130.

When the refrigerated marine container 200 is attached to the docking station 100, the water may preferably be cooled by the cooling means 140 in the docking station 100. However, the water may alternatively be cooled by means (not shown) arranged in the refrigerated marine container 200.

The temperature at which different species of aquatic animals pass into a hibernation state varies from species to species. However a typical temperature is below 5 degrees Celsius.

Thus, the transportation method simply consists in purifying and cooling the water in the tank units 300 until the animals are in a hibernation state while the tank units in the refrigerated marine container 200 is in the docking station 100, where after the animals are kept alive in the tank units 300 during the transport by only supplying compressed air from the cooled refrigerated marine container 200, and where the refrigerated marine container 200 at the destination shipping point is mounted in a docking station 100, where the water in the tank units is maintained at the hibernation temperature of the animals until the water is purified, Then the animals can be removed from the tank units 300 and be distributed to the consumers fresh and alive.

It is an advantage to keep the environment in the tank units in the pH neutral area, to give the aquatic animals the best conditions to stay fresh. An increase in the pH value from for example 7.2 to 8.2 will cause that the environment are going to be several times more toxic to the aquatic animals.

It is also possible according to the invention to attach one or more tank units to the docking station before placing the tank units in the refrigerated marine container.

The docking station can be configured in different embodiments, whether the docking station is meant to be a receiving docking station or a docking station for departure for shipment of the aquatic animals where the capacity of conditioning the water into a suitable state are different from receiving station and to departure docking station although the present components should be of the same kind (filter, compressor i.e.).

The invention claimed is:

1. A system for transporting live aquatic animals between shipping points, said system comprising:

a refrigerated marine container housing and comprising:
a plurality of tank units (300) containing water and the live animals for providing the animals with a life supporting aquatic environment during the transport; and
a unit for cooling connected to all of the plurality of tank units, the unit comprising means (240, 250, 260) for cooling, aerating and circulating the water in said tank units (300) at least during the transport;
said system further comprising docking stations (100) situated at said shipping points, said docking stations comprising
docking means for receiving said refrigerated marine container (200); and
means (120, 130, 140) for providing a life supporting aquatic environment for the live aquatic animals in said tank units (300) placed in said refrigerated marine container (200) when the refrigerated marine container (200) is attached to the docking station (100).

2. A system according to claim 1, wherein the means (120, 130, 140) for providing a life supporting aquatic environment for the live aquatic animals of the docking stations (100) comprises
circulation means (120) for circulating water between the tank units (300) in the refrigerated marine container (200) and the docking station (100); and
filtering means (130) for purifying water circulated between said tank units (300) in the refrigerated marine container (200) and the docking station (100).

3. A system according to claim 2, wherein the means (120, 130, 140) for providing a life supporting aquatic environment for the live aquatic animals of the docking stations (100) further comprises cooling means (140) for cooling water circulated between the tank units (300) in the refrigerated marine container (200) and the docking station (100).

4. A system according to claim 2, wherein the means (120, 130, 140) for providing a life supporting aquatic environment for the live aquatic animals of the docking stations further comprises means (150) for aerating the water circulated between the tank units (300) in the refrigerated marine container (200) and the docking station (100).

5. A system according to claim 1, wherein said refrigerated marine container (200) comprises a first piping (211) for circulating water between each of said tank units (300) and said docking station (100), while the refrigerated marine container (200) is attached to the docking station (100).

6. A system according to claim 5, wherein said first piping (211) leads water untreated from coupling means (111) provided between the docking station (100) and the refrigerated marine container (200) to and from the tank units (300) inside the refrigerated marine container (200).

7. A system according to claim 1, wherein said refrigerated marine container (200) comprises a second piping (260) for distributing air from the inside of said refrigerated marine container (200) to each of said tank units (300) in order to aerate the water inside the tank unit (300) and create an airlift effect in order to circulate the water in the tank unit (300) at least during transport.

8. A system according to claim 6, wherein said refrigerated marine container (200) further comprises air circulation means (250), preferably in the form of a compressor, said air circulation means (250) being separate from said means for cooling (240) the water in said tank units, and said air circulation means being in communication with said second piping (260).

9. A system according to claim 7, wherein each tank unit (300) comprises a tank 310 provided with its own individual set of filters (330) for at least partly purifying the water contained in the tank during transportation, said tank (310) and said filters (330) being integrated in a single unit.

10. A system according to claim 9, wherein the water contained in each tank unit (300) is circulated through said filters by the airlift effect caused by the air passed through said tank unit (300).

11. A system according to claim 9, wherein each tank unit (300) is provided with at least three filters (331, 332, 333), and wherein the filters are arranged in parallel communication with the tank (310).

12. A system according to claim 9, wherein said set of filters (330) comprises a mechanical filter and at least two biological filters.

13. A system according to claim 1, wherein the unit for cooling of the refrigerated marine container comprises a cooling unit (240) for cooling air passing through the cooling unit, and air circulation means for circulating air contained in the refrigerated marine container (200) through said cooling unit (240).

* * * * *

UNITED STATES PATENT AND TRADEMARK OFFICE
CERTIFICATE OF CORRECTION

PATENT NO. : 7,523,718 B2 Page 1 of 1
APPLICATION NO. : 11/386044
DATED : April 28, 2009
INVENTOR(S) : Ditte Torring et al.

It is certified that error appears in the above-identified patent and that said Letters Patent is hereby corrected as shown below:

On title page insert under item (30), line 2, provisional application
-- 60/664,504 03/23/2005 --

Signed and Sealed this

Fourth Day of August, 2009

JOHN DOLL
*Acting Director of the United States Patent and Trademark Office*